(12) United States Patent
Owen et al.

(10) Patent No.: US 8,293,378 B2
(45) Date of Patent: Oct. 23, 2012

(54) ANTI-CORROSIVE COATING FOR METAL SURFACES

(75) Inventors: William H. Owen, Fultondale, AL (US); A. Michael Horton, Trussville, AL (US); James Weber, Bayport, NY (US)

(73) Assignee: United States Pipe and Foundry Company LLC, Birmingham, AL (US)

( * ) Notice: Subject to any disclaimer, the term of this patent is extended or adjusted under 35 U.S.C. 154(b) by 105 days.

(21) Appl. No.: 12/315,529

(22) Filed: Dec. 4, 2008

(65) Prior Publication Data
US 2009/0252986 A1 Oct. 8, 2009

Related U.S. Application Data

(60) Provisional application No. 60/992,143, filed on Dec. 4, 2007.

(51) Int. Cl.
*B32B 15/04* (2006.01)
*B32B 15/08* (2006.01)
*B32B 15/18* (2006.01)
*B32B 15/20* (2006.01)
*F16L 9/147* (2006.01)
*B05D 1/00* (2006.01)
*B05D 1/02* (2006.01)
*B05D 1/10* (2006.01)
*B05D 3/00* (2006.01)
*B05D 7/14* (2006.01)
*B05D 7/16* (2006.01)
*B05B 1/08* (2006.01)

(52) U.S. Cl. ........ 428/626; 428/34.1; 428/546; 428/653; 428/659; 428/681; 428/684; 428/685; 428/457; 428/215; 428/332; 138/145; 427/447; 427/456; 427/123; 427/202; 427/205; 427/384; 427/388.1

(58) Field of Classification Search ............... 428/34.1, 428/626, 546, 567, 624, 630, 632, 633, 653, 428/659, 681, 684, 685, 457, 655, 212, 213, 428/214, 215, 216, 220, 332, 334, 335
See application file for complete search history.

(56) References Cited

U.S. PATENT DOCUMENTS
5,089,349 A * 2/1992 Kaiser .................. 428/472.1
(Continued)

FOREIGN PATENT DOCUMENTS
CN 1147563 * 4/1997
(Continued)

OTHER PUBLICATIONS
Machine Translation, Chen et al., CN 1147563, Apr. 1997.*
(Continued)

*Primary Examiner* — Michael La Villa
(74) *Attorney, Agent, or Firm* — Nathan W. Johnson; Nicholas J. Landau; Bradley Arant Boult Cummings LLP

(57) ABSTRACT

A protective coating for a metal substrate is provided that is light, durable, galvanically protective, and easily applied at the site of manufacture. The coating has at least two layers, one of which is a galvanizing layer and one of which is a micro-composite of a galvanic metal and a non-conducting material, such as polymer. Such coatings are useful for example to protect pipes or other metal surfaces in corrosive environments. Methods of producing the coating are provided, including methods that use advanced spraying techniques to provide very thin but consistent layers. Using the advanced spraying methods the composite layer can be created by co-spraying the galvanic metal and the nonconductive material onto the surface of the galvanic coating. Optionally, an outer coat of insulating material can be applied to provide further protection to the surface.

27 Claims, 1 Drawing Sheet

U.S. PATENT DOCUMENTS

| | | | | |
|---|---|---|---|---|
| 5,302,414 | A | * | 4/1994 | Alkhimov et al. ............ 427/192 |
| 5,409,970 | A | * | 4/1995 | Mosser et al. ................ 523/223 |
| 6,214,203 | B1 | | 4/2001 | Horton |
| 6,291,084 | B1 | * | 9/2001 | Darolia et al. ................ 428/633 |
| 6,554,992 | B1 | | 4/2003 | Smith |
| 2003/0064241 | A1 | * | 4/2003 | Suzuki et al. ................ 428/626 |
| 2004/0202885 | A1 | * | 10/2004 | Seth et al. .................... 428/565 |
| 2006/0105191 | A1 | * | 5/2006 | Holdik et al. ................ 428/545 |
| 2007/0289879 | A1 | * | 12/2007 | Horton ......................... 205/724 |

FOREIGN PATENT DOCUMENTS

| | | | |
|---|---|---|---|
| JP | 63-179735 | * | 7/1988 |
| WO | WO 99/50478 | | 10/1999 |

OTHER PUBLICATIONS

Sulzer Metco Product Data Sheet on 9MBH Plasma Spray Gun, 2004 (no month), 4 pages.*

Chen et al., CN 1147563, Apr. 1997.*

Abstract, Dowan JP 63-179735, Jul. 1988.*

Nema, "White Paper on Hexavalent Chrome on Steel Conduit," (2004, no month) (four pages), downloaded from https://www.nema.org/gov/ehs/positions/upload/White%20paper%20Chromium%20NEMA%201%2004.pdf.*

Translation, Dowan, JP 63-179735, Jul. 1988.*

Vanysek. P. Electrochemical Series', online vesion of CRC Handbook of Chemistry and Physics, 81st (2000-2001) ed. downloaded From: www.nmsl.chem.ccu.edu.tw/pdf/CRC%20Handbook/08_08_00_Electrochemical%20Series.pdf.

Herman, H. et al Thermal Spray Coating. Dept. of Materials Science and Engineering. SUNY Stony Brook. NY [online]. Oct. 31, 2007 [retrieved from the Internet on Jan. 21, 2009): web.archive.org/web/20071031085938/http://www.matscieng.sunysb.edu/tsl/thermal/article1.htm.

International Search Report, International Application No. PCT/US08/13348, (Mar. 2009).

* cited by examiner

# ANTI-CORROSIVE COATING FOR METAL SURFACES

CROSS-REFERENCE TO RELATED APPLICATIONS

This application cites for priority U.S. Provisional Patent Application 60/992,143, filed on Dec. 4, 2007, the contents of which are incorporated herein by reference in their entirety.

BACKGROUND

A. Field of the Disclosure

The field of this disclosure is advanced anti-corrosive coatings for metal surfaces.

B. Background of the Art

Corrosion is an electrochemical process in which a current leaves a structure at an anode site, passes through an electrolyte, and reenters the structure at a cathode site. For example, one small section of a pipeline may be anodic because it is embedded in soil that is more conductive than the soil along the rest of the pipeline. Current flows between the anode and cathode facilitated by the conductive pipe and the electrolytic soil or groundwater medium. In the process, the metal in the pipe undergoes a shift in oxidation state that results in electrochemical corrosion.

Cathodic protection is a method to reduce corrosion by minimizing the difference in potential between anode and cathode. This is achieved by applying a current to the structure to be protected from some outside source. When enough current is applied, the whole structure will be at one potential; thus, anode and cathode sites will not exist. Cathodic protection is commonly used on many types of structures in corrosive electrolytic environments, such as pipelines, underground storage tanks, locks, and ship hulls.

There are two main types of cathodic protection systems: galvanic and impressed current. A galvanic cathodic protection system makes use of the corrosive potentials for different metals. Without cathodic protection, when one area of the structure has a higher negative potential than another, corrosion results. If, however, a much less inert object (that is, an object with much more negative potential) is placed adjacent to the structure to be protected, such as a pipeline, and an electrical connection exists between the object and the structure, the object will become the anode and the entire structure will become the cathode. The new object corrodes instead of the structure thereby protecting the structure. In this example, the object is called a "sacrificial anode." Thus, the galvanic cathodic protection system is also called a "sacrificial cathodic protection system" because the anode corrodes "sacrificially" to protect the structure. Galvanic anodes are made of metals with higher negative potential than the metal of the structure itself; the metal of the anode is said to be "anodic" compared to the metal of the structure.

Attachment of the anode is normally done at the jobsite utilizing underground insulated wire, thermite weld, conventional weld, or threaded bolts. Problems related to these methods of attachment to the structure include, but are not limited to: improper placement of the anode, improper size of the anode, improper composition of the anode, damage to the metallic object or the internal lining from excessive heat from the weld, loss of structural integrity of the metallic object, damage to the anode, wire, or electrical connection during installation and backfilling operations, improper weld or connection at the jobsite resulting in the loss or reduction in effectiveness of protection, and failure to remove protective wrapping from the anode prior to burial. Traditional sacrificial anode placement also requires extra trench excavation either several feet below the structure or several feet to the side of the structure. As a result, there is a long-felt need in the art for an effective means of galvanic protection without these limitations.

One method of protection which solves the problems listed above is a metallic sacrificial coating applied directly to the structure's surface. The coating acts as a barrier between the metal in the structure and the environment, and if breached it acts as a sacrificial anode to prevent corrosion. However, traditional methods of providing a sacrificial coating have several drawbacks. Traditional methods, such as hot-dip galvanizing, electroplating, thermal diffusion galvanizing, and vapor galvanizing are expensive, energy-intensive, time-intensive, and provide poor control of the thickness and consistency of the anodic coating. Accordingly, there is a long-felt need in the art for methods of applying corrosion protection that allow rapid, inexpensive, thin yet complete coatings to be applied.

As materials become increasingly expensive, there is a need to provide thin yet effective galvanizing layers. Although thin layers of anodic metal have the advantage of lower weight and cost, they have the disadvantages of being easily damaged or worn off. An anodic layer can be protected by a barrier layer, but over time barrier layers have a tendency to delaminate and allow corrosive material to contact the anodic layer. Accordingly, there is a long-felt but unmet need in the art for a galvanically protective coating paired with a barrier coating that will be durable, long-lasting, and with superior adhesion characteristics.

SUMMARY

The disclosure provides novel and useful coated metal surfaces, processes of making the same, and methods of protecting metal surfaces from corrosion.

It is a goal of some embodiments of the coated surfaces and processes of the disclosure to provide galvanic protection to a metal surface that does not require post-manufacturing assembly or construction. It is a goal of some embodiments of the coated surfaces and processes to provide galvanic protection to a metal surface rapidly and economically. It is a goal of some embodiments of the coated surfaces and processes of the disclosure to provide a galvanic coating and a dielectric coating that will have superior adhesive qualities.

These and other goals are met by providing a coated metal surface, comprising: a metal substrate; a metallic layer (1) in contact with the substrate, said metal layer comprising a first anodic metal; and a composite layer (2) in contact with the metallic layer, said composite layer comprising a matrix of a first dielectric material and a second anodic metal, wherein the second anodic metal is substantially electrically connected to the metal substrate. It is desirable to add additional barrier protection in the form of a topcoat comprising a second dielectric material.

These and other goals are also met by providing a process of coating a metal surface, comprising: applying a metallic layer comprising an anodic metal to a metal substrate; and applying a composite layer comprising a second anodic metal and a first dielectric material to the metallic layer, the application of the composite layer comprising spraying the first dielectric material on the metallic layer and spraying the second anodic metal on the metallic layer; wherein the second anodic metal is substantially electrically connected to the metal substrate. It is desirable to further apply a topcoat to the composite layer, the topcoat comprising a second dielectric material.

DETAILED DESCRIPTION

A. Definitions

Figure 1:
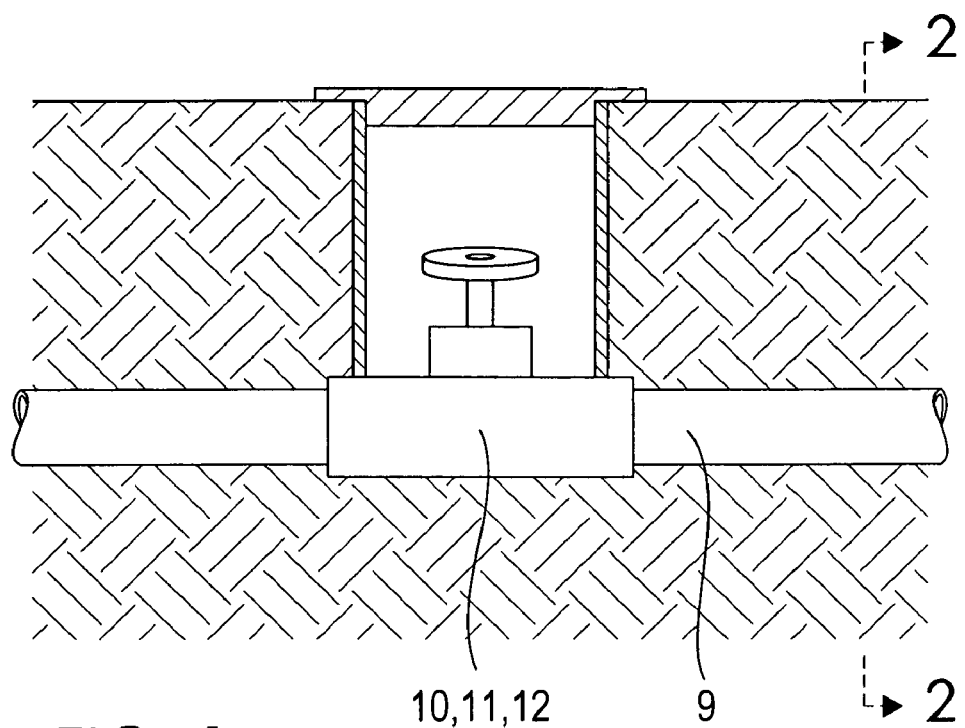
FIG. 1: This figure depicts a coated underground pipe and valve.
Figure 2:
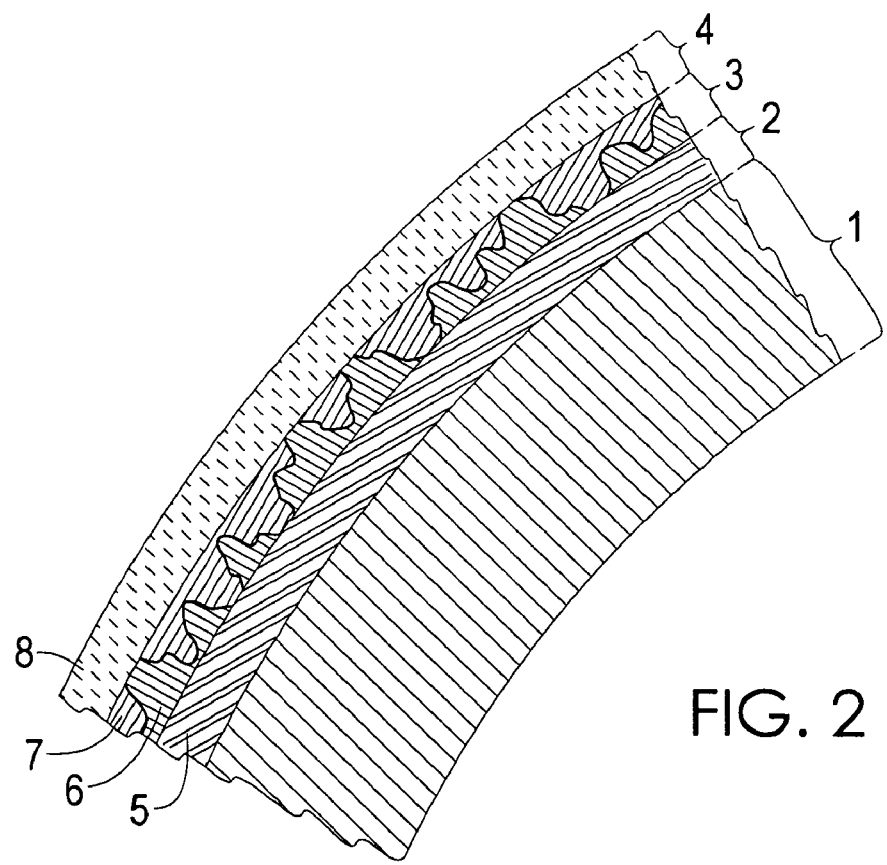
FIG. 2: This figure shows a cut-away view of the pipe of FIG. 1 to illustrate a metallic layer, a composite layer, and a topcoat on the substrate (pipe wall).

The terms "include" and "including" as used herein are non-limiting, and can be read to mean "including but not limited to."

The term "anodic" as used herein refers to the property of having a more negative electrical potential than some reference substance. Unless otherwise stated, in this disclosure the reference substance is a metal substrate that is the subject of galvanic protection.

All terms in the singular should be read to include the plural, and vice-versa, unless otherwise stated. Similarly, any male pronouns should be read to include the female, and vice-versa, unless otherwise stated. Unless stated otherwise, terms should be read to have their accepted dictionary definitions.

B. Coated Metal Surfaces

As explained above, metal surfaces exposed to an electrolyte are subject to electrochemical corrosion, particularly if the surface develops differentially charged regions such that some parts of the surface function as cathodes and others as anodes. Corrosion can be deterred using a galvanic cathodic protection system. Galvanic coatings have numerous advantages over other forms of anode. However, galvanic coatings, if damaged, can expose the underlying metal substrate 1. Although the underlying metal substrate 1 will still be galvanically protected, it will be subject to more rapid corrosion than otherwise and is vulnerable to further mechanical damage. For this reason, it is desirable to provide a coating to protect the surface from mechanical insult, to prevent contact with corrosive substances in the environment, and to insulate the substrate 1 from stray electrical currents. By separating the metal substrate 1 from corrosion-inducing aspects of the environment, non-galvanic "barrier" coatings can also be effective in preventing corrosion.

These and other goals can be achieved by providing a metal substrate 1 to be protected, a metallic layer 2 in contact with the substrate 1, and a composite layer 3 in contact with the metallic layer 2. The metallic layer 2 comprises a metal that is anodic with respect to the substrate 1, and which is electrically connected to the substrate 1. The composite layer 3 comprises a combination of a second metal that is anodic with regard to the substrate 1, and a dielectric material. The second anodic metal 6 is substantially electrically connected to the metal substrate 1, such that it provides galvanic protection to the substrate 1. The dielectric material provides at least partial protection from electrical currents, the corrosive environment, and mechanical damage. It is optional yet desirable to provide a dielectric topcoat 4 in contact with the composite layer 3.

1. Substrate

The metal substrate 1 can be any metal that is subject to electrochemical corrosion, as known by those skilled in the art. Because underground and submerged structures are particularly subject to corrosion, metals that are commonly used in underground and submerged structures are advantageously protected by the coating. In pipes the metal is typically ferrous metal, steel, iron (including ductile iron), other iron alloys, lead, nickel, brass or copper. However, the utility of the coatings is not limited to these metals or to any particular applications.

The metal substrate 1 will often be a portion or an outer surface of a greater system or structure. This can be a structure that is in periodic, frequent, or constant contact with an electrolyte. Such structures may be underground, submerged, or in extremely humid environments. They include a pipe 9, a pipe fitting 10, a pipe valve 11, a pump component, a pipe fixture, and an appurtenance 12 to a pipe 9. One example is piping that is subject to corrosion, such as underground piping. Underground piping systems are well known in the art, and include important infrastructure systems such as freshwater pipes, sewer pipes, storm drains, steam pipes, and fuel gas pipes. Such conveyances are virtually always located underground between source points (such as treatment or production plants) and delivery points. Aboveground pipes may also be suitable substrates 1, particularly in areas of high humidity or precipitation.

Among the most vulnerable surfaces to corrosion are marine surfaces, or other surfaces subjected to high electrolyte concentrations. Hulls, chains, seawalls, locks, pipelines, and virtually any other metallic marine equipment could serve as the substrate 1.

To facilitate coating of the substrate 1, the substrate 1 may be abraded or heated. If the substrate 1 is heated, the temperature will typically be up to the fusion temperature of the coating. For certain purposes it is optimal to heat the substrate 1 to the coating's fusion temperature or about this temperature. While it is advantageous to heat or abrade the substrate 1 for this purpose, it is not absolutely necessary.

2. Metallic Layer

A metallic layer 2 is present in contact with the substrate 1. The metallic layer 2 may cover the entire substrate 1, or only a portion of the substrate 1. The portion will often be the part of the substrate 1 that is most likely to encounter corrosive conditions (such as the exterior surface of an underground pipe). The thickness of the metallic layer 2 will depend on several factors. Thinner metallic layers 2 have the advantages of lower cost and lower weight. Thicker metallic layers 2 have the advantage of greater durability and longevity. In piping, if the coating as a whole is too thick, assembly of the coated parts becomes more complicated or impossible. For example, it has been found that coatings on push-on ductile iron pipe and associated parts should not exceed about 16 mils (406.4 μm) for ease of assembly and seal integrity. It is desirable that the metallic layer 2 be at least 5 μm thick. To balance these competing advantages, the thickness of the metallic layer 2 may be 25-200 μm, 70-80 μm, or about these ranges.

The metallic layer 2 is composed of a metal that is anodic in comparison to the substrate 1 (a "first anodic metal" 5). This can be any metal that is anodic to the metal of the substrate 1. For ferrous substrate metals, the anodic metal can be for example zinc, aluminum, magnesium, indium, gallium, or alloys of one or more of the foregoing. The anodic metal may comprise tellurium. The metallic layer 2 will often comprise a very high content of the anodic metal, for example 99% or about 99%. The alloys may comprise non-metallic elements, for example carbon or silicon, as is understood by those skilled in the art. Particularly useful anodic metals for ferrous substrate is are zinc, magnesium, aluminum-zinc alloy, aluminum-silicon alloy, and indium alloy. Indium alloys are particularly useful in high salinity environments.

An aluminum-zinc alloy can be used that comprises, for example, 85 parts aluminum to 15 parts zinc (or about this ratio). An aluminum-silicon alloy can be used that comprises, for example, 88 parts aluminum to 12 parts silicon (or about this ratio). The metallic layer 2 can be applied by any method known in the art, or by spraying techniques described below. The spraying techniques have the advantage of applying a thin consistent layer rapidly at low cost.

It is critical to the coating that the metallic layer 2 is at least partially electrically connected to the substrate 1. It is desirable that the metallic layer 2 be completely electrically connected to the substrate 1.

3. Composite Layer

A composite layer 3 is present in at least partial contact with the metallic layer 2. The composite layer 3 is comprised of a second anodic metal 6 and a first dielectric material 7. The second anodic metal 6 and a first dielectric material 7 are interspersed in the layer so as to form a matrix of the two substances. The matrix can be of regular configuration or it can be of randomized configuration. The matrix will allow the second anodic metal 6 to contact the metallic layer 2 in at least substantial portions of the composite layer 3. This contact allows the second anodic metal 6 to be electrically connected to the substrate 1 through its electrical connection to the metallic layer 2. In other words, when viewed from the side cross-section, it is desirable that the composite layer 3 be such that either: 1) the anodic metal particles are large and the thickness of the composite layer 3 is small such that the anodic metal particles protrude through and are exposed on both sides of the composite layer 3 or 2) the concentration of the metal particles is sufficient to result in an electrically continuous conductive path from one side of the composite layer 3 to the other. The ratio of second anodic metal 6 to first dielectric material 7 should be formulated with this in mind.

The second anodic metal 6 can be any metal that is anodic with regard to the substrate 1. The second anodic metal 6 can be any of the metals described as suitable for the first anodic metal 5. In some cases the first anodic metal 5 and the second anodic metal 6 will be the same. This has the advantages of simplicity in manufacturing, good galvanic protection, and superior adhesion between the composite layer 3 and the metallic layer 2.

The first dielectric material 7 provides partial barrier protection to the surface. Furthermore, if additional layers are present, the first dielectric material provides superior adhesion to the coated surface, preventing nonadhesion events such as spalling and blistering.

The first dielectric material 7 can be any dielectric material with adequate dielectric and barrier properties. It is advantageous if the dielectric material is conducive to being applied by thermal or cold spraying. Such materials include thermoplastic and thermoset polymers. Polymer dielectric materials with adequate barrier and dielectric properties include epoxy, polyethylene, polyester, polypropylene, nylon, polytetrafluoroethylene, ethylene methacrylate acid copolymer, polyurethane, and silicone. Epoxy, polyethylene, and polypropylene have been seen to perform well as dielectric and barrier materials.

Alternatively, the first dielectric material 7 can be inorganic or an organic non-polymer. Examples of such dielectric materials include ceramics, inorganic salts, and minerals.

The thickness of the composite layer 3 will be determined by a number of factors. As stated previously, the coating as a whole should generally be below some maximum thickness that is determined by the application (16 mils (406.4 µm) in the case of push-on ductile iron pipe). A thin composite layer 3 has the advantage of allowing oxidized corrosion products from the metallic layer 2 to diffuse outward efficiently; otherwise there is the potential that oxidization product will cause the metallic layer 2 to swell, resulting in blistering of the coating and accelerated corrosion. Acceptable thicknesses of the composite layer 3 can be, for example, 5-200 µm, 20-30 µm, or about these ranges. However, it is believed that 0.5-10 mils (12.7-254 µm) or about this range is an optimal thickness when applied to some surfaces, such as piping.

4. Topcoat

Some embodiments of the coated surface comprise a topcoat 4. The topcoat 4 functions as a barrier coating, preventing contact between lower layers 1,2,3 and the potentially corrosive environment. This includes preventing contact between the lower layers 1,2,3 and electrolytes. The topcoat 4 also functions as a dielectric coating, preventing contact between the lower layers 1,2,3 and unwanted electrical currents. The topcoat 4 may also function to prevent contact between the lower layers 1,2,3 and solid objects that would otherwise wear away the lower layers 1,2,3 or conduct unwanted electric currents to the lower layers 1,2,3. The topcoat 4 can also function to protect the lower layers 1,2,3 from wear resulting from contact with flowing fluids, with or without suspended abrasive particles. It is advantageous if the topcoat 4 is dielectric, resistant to wear, resistant to fracture, impermeable to water (or other electrolytic fluids), and flexible. It is also advantageous if the topcoat 4 is inexpensive, and amenable to advanced coating techniques, such as thermal spraying and cold spraying.

The topcoat 4 comprises a second dielectric material 8. The second dielectric material 8 may be any material that is disclosed as suitable as the first dielectric material 7. If the second dielectric material 8 and the first dielectric material 7 are the same, the topcoat 4 will have the advantage of excellent adhesion to the composite layer 3 and simplicity of manufacture. Selection of a second dielectric material 8 that adheres well to the first dielectric material 7 will advantageously avoid delamination, blistering, and spalling that often occurs between protective layers.

The thickness of the topcoat 4 will vary depending on the structure to be coated, the environment, the dielectric material used, and other factors. A thin layer has the advantage of the efficient diffusion of corrosion products from the lower layers 1,2,3, lower weight, lower volumes and lower cost. A thin layer will also pose less interference in using coated structures due to increased thickness (as stated above, it has been found that coatings on push-on ductile iron pipe and associated parts should not exceed about 16 mils (406.4 µm) for ease of assembly and seal integrity). A thick layer has the advantage of more robust and lasting protection. Examples of desirable thicknesses of the topcoat 4 include 5-200 µm, 95-105 µm, and about these range.

The coated surface, and any individual layer, may also be the product of any of the processes described below.

C. Processes of Coating a Metal Surface

Novel processes of coating a metal surface have been developed. These processes are useful to produce the coated metal surfaces of this disclosure, as well as other coatings.

The processes involve applying a metallic layer 2 comprising a first anodic metal 5 to a metal substrate 1 and applying a composite layer 3 comprising a second anodic metal 6 and a first dielectric material 7 to the metallic layer 2, the application of the composite layer 3 comprising spraying the first dielectric material 7 on the metallic layer 2 and spraying the second anodic metal 6 on the metallic layer 2, wherein the second anodic metal 6 is substantially electrically connected to the metal substrate 1. In some embodiments, the application of the composite layer 3 may be accomplished by an application process whereby the second anodic metal 6 and the first dielectric material 7 are co-sprayed jointly onto the first metallic layer 2, wherein the second anodic metal 6 is substantially electrically connected to the metal substrate 1. Some embodiments of the processes further comprise applying a topcoat 4 to the composite layer 3, the topcoat 4 comprising a second dielectric material 8. The anodic metals and dielectric materials can be any of these disclosed above as suitable for the coated surface.

The layers may be applied by any methods known in the art. However, there are distinct and unique advantages to the use of advanced spray methods to apply at least one of the layers. Advanced spray methods are inexpensive compared to other coating methods. They require little infrastructure, require little time, and can be performed on the site at which the substrate 1 is manufactured. Spray techniques can achieve thin yet uniform layers which are of unique value in rigorously protecting surfaces without unnecessary weight or volume.

Thermal spraying is particularly useful in the disclosed coated metal surfaces and processes. Any thermal spraying method can be used, including detonation spraying, flame spraying (powder or wire), high-velocity liquid fuel spraying, high-velocity air fuel spraying, high-velocity oxygen fuel spraying, plasma spraying, and wire arc spraying. Cold spraying and warm spraying techniques can be used; in some cases the material to be sprayed will be heated prior to application by cold spraying. If the material is applied by thermal spraying, the sprayed material will be in a liquid state at the time it is sprayed. If the sprayed material is applied by cold spraying or warm spraying, the sprayed material may be solid or liquid at the time it is sprayed. Some sprayed materials, such as thermoset plastics, may be liquid during cold spraying or warm spraying.

1. Application of the Metallic Layer

The metallic layer 2 may be applied to the substrate 1 by any method known in the art. Such methods include hot-dip galvanizing, electroplating, thermal diffusion galvanizing, and vapor galvanizing. The metallic layer 2 may also be applied by advanced spraying techniques. Flame spraying (wire or powder) and wire arc spraying are examples of advanced spraying methods that produce good results in applying the metallic layer 2. The first anodic metal 5 may be cold-sprayed onto the substrate 1, in which case the metal will be below its fusion temperature during spraying. Spraying metal at low temperature has the advantage of inflicting less thermal stress on the substrate 1, and allowing the newly coated substrate 1 to be handled or moved soon after spraying. If the first anodic metal 5 is thermally sprayed onto the substrate 1, it will be sprayed at or above the fusion temperature of the anodic metal.

Regardless of whether thermal or cold spraying methods are used, the first anodic metal 5 may be heated. Heating can occur prior to spraying, during spraying, or after spraying to achieve different effects.

Heat to facilitate adhesion and mixing can also be provided by conduction from the substrate 1. The substrate 1 may be heated for the intended purpose of heating the first anodic metal 5 on contact to improve adhesion, or the substrate 1 may be heated as part of another process incidental to the coating process. One example of such incidental heating is the residual heat from annealing. The substrate's 1 temperature may be, for example, about the fusing temperature of the first anodic metal 5. The substrate's 1 temperature may also be below the temperature of fusion of the first anodic layer; under these conditions adhesion will be enhanced and the first anodic metal 5 will be more solid. For example, if the first anodic metal 5 were zinc, desirable substrate temperature ranges would be up to 850° F., 70-800° F., 400-500° F., or about these ranges.

Prior to the application of the metallic layer 2 the substrate 1 may be abrasive blast cleaned. Abrasive blast cleaning can be used to remove contaminants while allowing protective oxides to remain on the substrate 1. Abrasive blast cleaning also can serve to increase adhesion between the substrate 1 and the metallic layer 2 by abrading the surface of the substrate 1.

2. Application of the Composite Layer

The composite layer 3 can be applied using any method known in the art, but advantageously will be applied by co-spraying the first dielectric material 7 and the second anodic metal 6.

The second anodic metal 6 and the first dielectric material 7 may be sprayed simultaneously or sequentially. If sprayed sequentially, the earlier sprayed material will form a thin layer in which the later sprayed material is then embedded. It is desirable that both the metal and the dielectric will be in substantial contact with the metallic layer 2. It is critical that the second anodic metal 6 be substantially electrically connected to the substrate 1, via the metallic layer 2. In this context, "substantially electrically connected" means that a substantial portion of the second anodic metal 6 deposited can convey a current to the substrate 1. If not electrically connected to the substrate 1, the second anodic metal 6 cannot serve as a sacrificial anode. Such electrical connection can generally only be achieved through direct contact between the second anodic metal 6 and the metallic layer 2, although it is possible that such a connection can be established across small gaps.

If sprayed simultaneously, the second anodic metal 6 and the first dielectric material 7 may be sprayed from the same spray head or spray heads, in which case they must be mixed prior to emission from the spray head. Alternatively, the two materials may be simultaneously sprayed from distinct spray heads; in this case, the materials will not mix until they are aerosolized or until they impact the metallic layer 2. If sprayed from the same spray head, the two materials will of necessity be at the same temperature when sprayed and the two materials will of necessity be applied to the metallic layer 2 by the same spray method. The spraying technique may be any of those discussed above as useful in the process, including cold spraying, warm spraying and thermal spraying. If sprayed from distinct spray heads, either material may be sprayed by any technique discussed above as useful in the process independent of the other, including cold spraying, warm spraying and thermal spraying. The spray temperatures of each material will also be independently selected.

If thermal spraying is used, the sprayed material will be heated to a suitable temperature. The temperature may be the fusion temperature of the sprayed material, or it may be above the fusion temperature. Generally an organic polymer will not be applied via thermal spraying unless it is a thermoplastic. If both materials are sprayed at the same temperature (for example, when emitted from the same spray head), the temperature may be at or above the fusion temperature of the material having the higher fusion temperature. Thermal spraying techniques generally rely on the sprayed material being in a liquid state, whereas in cold spraying and warm spraying the sprayed material may be in a solid state or a liquid state. Either approach may be used in the process. If the dielectric material 7,8 is a thermoset polymer, the dielectric material 7,8 may be sprayed as a liquid at low temperature, as it will solidify independent of temperature upon curing. A thermoset polymer may be cold sprayed or warm sprayed in a liquid state.

In order to achieve optimum benefits and performance of the composite layer 3, it is desirable that the thickness of the composite layer 3, the size of the metal droplets, and the concentration of the metal droplets be in a ratio designed such that the metal droplets in the composite layer 3 are in contact with the sacrificial metal coating of the metallic layer 2.

Droplet size of the sprayed metallic particles may vary considerably depending on the type of metal being sprayed, the type of application utilized, and many other variables. For example, the three most common methods of applying thermally sprayed metals to pipe are electric arc spray, combustion gas spray utilizing wire, and combustion gas spray utilizing powder.

Among the variables that affect the chosen droplet size of the second anodic metal 6 are the form of the feed (wire, powder, liquid, etc.), size of the feed particles, feed rate, air delivery pressure, combustion gas pressures (for combustion gas spray), voltage utilized (for electric arc spray), type of spray gun utilized, spray tip configuration, spray tip size, distance from the spray gun tip to the part being sprayed, and ambient conditions.

It is necessary that the thickness of the composite layer 3 be properly designed based on metal particle size and configuration and the concentration of the metal particles dispersed in the composite layer 3. One object is to ensure that the second anodic metal 6 will be substantially electrically connected to the substrate 1. This can be achieved, for example, by ensuring that the thickness of the layer does not exceed the average diameter of the individual metal particles. As another example, the same goal can be achieved by ensuring that the desirable matrix configuration is such that the size and concentration of the metal droplets are sufficient to result in an electrically continuous conductive path from one side of the composite layer 3 to the other.

Many of the same parameters must be considered in spraying the first dielectric material 7. Variables which influence determination of the proper layer thickness and concentration of first dielectric material 7 include but are not limited to: form of the feed, size of the feed particles, feed rate, air delivery pressure, combustion gas pressures (for combustion gas spray), voltage utilized (for electrostatic spray), type of spray gun utilized, spray tip configuration, spray tip size, distance from the spray gun tip to the part being sprayed, ambient conditions, type of polymer, average size of polymer particles, size distribution of polymer particles, type of application equipment, temperature of the polymer at the time of contact with the surface, relationship of the molten metal stream to the dielectric material stream (i.e. metal and dielectric sprayed side-by-side with different guns, metal and dielectric pre-mixed together and sprayed from one gun, or metal sprayed immediately behind the dielectric spray), whether or not a multi-pass application process is utilized, distance from the spray tip to the surface being coated, size of the dielectric spray tip, and design of the dielectric spray tip.

The optimum thickness of the composite layer 3 will vary based on the many variables described above. For example, for certain types of pipe, it is desirable to vary the thickness between approximately 0.5 mils (12.8 μm) and 10 mils (256 μm).

In one exemplary embodiment, the composite layer 3 is applied utilizing thermal spray techniques, where the dielectric material 7 is powder fed through a hopper. The dielectric material 7 is applied at the fusing temperature of the dielectric material 7. The second anodic metal 6 and the first dielectric material 7 are applied substantially simultaneously from two or more applicator guns, the mixing occurring at the deposition site.

3. Application of the Topcoat

Some embodiments of the process comprise applying a topcoat 4 comprising a second dielectric material 8 to the composite layer 3. The second dielectric material 8 can be any material described above as suitable as the first dielectric material 7. In some embodiments, the first and second dielectric materials 7, 8 are the same material. Such embodiments have the advantage of simplicity in manufacturing and superior adhesion between the topcoat 4 and the composite layer 3. The topcoat 4 may be applied by any means known in the art, but it is particularly advantageous to apply the topcoat 4 by the advanced spray methods disclosed herein.

Applying the topcoat 4 provides a barrier layer without need for further assembly or application when a pipe 9 is installed. This has significant advantages over previous methods, which often require that coverings or sheaths be placed over surfaces or pipes prior to burial. Such methods are vulnerable to errors in deployment and accidents that can result in incorrect use of the barrier or damage to the outer layer. Some advantages of applying the topcoat 4 via advanced spray methods are that it can be performed during manufacturing, it can be performed quickly, it can be performed at low cost, and it can provide thin and consistent layering.

D. Examples

In one example, a metallic layer 2 of zinc was arc sprayed as a wire on to a substrate 1 of 6" ductile iron pipe while the substrate 1 was at 250° F. The metallic layer 2 contained 200 g zinc per $m^2$ substrate surface. A composite layer 3 of zinc-impregnated thermoplastic polyolefin powder was then applied by flame spraying the polyolefin powder while simultaneously arc spraying the metallic zinc wire with an arc spray gun. A topcoat 4 of thermoplastic polyolefin powder was then applied by flame-spraying.

In another example, a metallic layer 2 of zinc was flame sprayed as a wire on to a substrate 1 of 6" ductile iron pipe while the substrate 1 was at 850° F. The metallic layer 2 contained 200 g zinc per $m^2$ substrate 1 surface. After the pipe was allowed to cool to between 350 and 400° F., a composite layer 3 of zinc-impregnated thermoplastic polypropylene powder with fibers was then applied by simultaneous flame spraying of both the propylene powder and the zinc wire. A topcoat 4 of polypropylene powder with fibers was then applied by flame-spraying.

In yet another example, a metallic layer 2 of zinc was flame sprayed as a wire on to a substrate 1 of 6" ductile iron pipe while the substrate 1 was at 850° F. The metallic layer 2 contained 200 g zinc per $m^2$ substrate surface. After the pipe was allowed to cool to between 350 and 400° F., a composite layer 3 of zinc-impregnated thermoplastic polyethylene powder was then applied by simultaneous flame spraying of both the polyethylene powder and the zinc wire. A topcoat 4 of polyethylene was then applied by flame-spraying.

E. Conclusions

The foregoing description illustrates and describes the coated surfaces, processes and other teachings of the present disclosure. Additionally, the disclosure shows and describes only certain embodiments of the coated surfaces, processes and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the coated surfaces, processes and other teachings of the present disclosure and to enable others skilled in the art to utilize the teachings of the present disclosure in such, or other, embodiments and with the various modifications required by the particular applications or uses. Accordingly, the coated surfaces, processes and other teachings of the present disclosure are not intended to limit the exact embodiments and examples disclosed herein.

We claim:

1. A coated metal surface, comprising:
   (a) a metal substrate;
   (b) a metallic layer in direct contact with the substrate and continuously adhered to the substrate, said metallic layer comprising a first anodic metal wherein the metallic layer is 25 to 200 µm thick;
   (c) a composite layer in direct contact with the metallic layer, said composite layer consisting essentially of a matrix of a first dielectric polymeric material and second anodic metal, wherein the second anodic metal is substantially electrically connected to the metal substrate and wherein the composite layer is 5 to 200 µm thick; and
   (d) a dielectric topcoat in contact with the composite layer, comprising a second dielectric material wherein the topcoat is 5 to 200 µm thick.

2. The coated metal surface of claim 1, wherein the metal substrate comprises iron.

3. The coated metal surface of claim 1, wherein the metal substrate comprises a structure selected from the group consisting of a pipe, a pipe fitting, a pipe valve, a pump component, a pipe fixture, and an appurtenance to a pipe.

4. The coated metal surface of claim 3, wherein the structure is for the conveyance from a source point to a delivery point of at least one of: freshwater, wastewater, and fuel gas.

5. The coated metal surface of claim 1, wherein the second anodic metal is the first anodic metal.

6. The coated metal surface of claim 1, wherein at least one of the first anodic metal and the second anodic metal comprises tellurium.

7. The coated metal surface of claim 1, wherein each of the first anodic metal and the second anodic metal are independently selected from the group consisting of: zinc, aluminum, magnesium, indium, gallium, and alloys thereof.

8. The coated metal surface of claim 5, wherein the first anodic metal and the second anodic metal comprise an aluminum-zinc alloy.

9. The coated metal surface of claim 8, wherein the aluminum: zinc ratio is about 85:15 w/w.

10. The coated metal surface of claim 5, wherein the first anodic metal and the second anodic metal are selected from the group consisting of: indium, an indium alloy, and an aluminum-silicon alloy.

11. The coated metal surface of claim 10, wherein the first anodic metal and the second anodic metal comprise an aluminum-silicon alloy wherein the aluminum: silicon ratio is about 88:12 w/w.

12. The coated metal surface of claim 1, wherein the first dielectric material is the second dielectric material.

13. The coated metal surface of claim 12, wherein the dielectric material is selected from the group consisting of: epoxy, polyethylene, polypropylene, nylon, polytetrafluoroethylene, ethylene methacrylate acid copolymer, polyurethane, and silicone.

14. The coated metal surface of claim 1, wherein the composite layer is the product of the process comprising thermally spraying the first dielectric material on the metallic layer and simultaneously thermally spraying the second anodic metal on the metallic layer.

15. A coated metal surface, comprising:
   (a) a metal substrate;
   (b) a metallic layer in direct contact with the substrate and continuously adhered to the substrate, said metallic layer comprising a first anodic metal wherein the metallic layer is 25 to 200 µm thick; and
   (c) a composite layer in direct contact with the metallic layer, said composite layer consisting essentially of a matrix of a first dielectric polymeric material and a second anodic metal, wherein the second anodic metal is substantially electrically connected to the metal substrate and wherein the composite layer is 5 to 200 µm thick.

16. A coated iron surface, comprising:
   (a) a substrate consisting essentially of iron alloy;
   (b) 25 to 200 µm thick metallic layer coating the surface, said metallic layer consisting essentially of an anodic metal;
   (c) 5 to 200 µm thick composite layer coating the metallic layer, said composite layer consisting essentially of the product of the process comprising: simultaneously thermally spraying a metal component and dielectric polymeric component on the metallic layer, wherein the metal component is the anodic metal and wherein the dielectric polymeric component is a first dielectric polymeric material; and
   (d) 5 to 200 µm thick topcoat consisting essentially of the first dielectric polymeric material;
   wherein the metallic layer is substantially electrically connected to the surface, and the metal component is substantially electrically connected to the surface.

17. A process of coating a metal surface, comprising:
   (a) adhering 25 to 200 µm thick metallic layer comprising an anodic metal directly to a metal substrate;
   (b) applying 5 to 200 µm thick composite layer consisting essentially of a second anodic metal and a first dielectric polymeric material to the metallic layer, the application of the composite layer comprising spraying the first dielectric polymeric material on the metallic layer and spraying the second anodic metal on the metallic layer; and
   (c) applying 5 to 200 µm thick topcoat to the composite layer, said topcoat comprising a second dielectric material;
   wherein the second anodic metal is substantially electrically connected to the metal substrate.

18. The process of claim 17, further comprising heating at least one of the second anodic metal and the first dielectric material.

19. The process of claim 18, wherein at least one of spraying the first dielectric material and spraying the second anodic metal comprises thermal spraying.

20. The process of claim 17, wherein at least one of spraying the first dielectric material and spraying the second anodic metal comprises cold spraying.

21. The process of claim 17, further comprising mixing the first dielectric material and the second anodic metal prior to spraying.

22. The process of claim 19, wherein the first dielectric material comprises a thermoplastic polymer.

23. The process of claim 17, wherein the first dielectric material is sprayed simultaneously as the second anodic metal is sprayed.

24. The process of claim 18, further comprising heating the second anodic metal and the first dielectric material upon contact with the metallic layer.

25. The process of claim 17, wherein the first anodic metal and the second anodic metal are the same, and wherein the first dielectric material and the second dielectric material are the same.

26. The process of claim 17, further comprising heating the substrate to approximately the fusion temperature of the first anodic metal.

27. A process of coating a metal surface, comprising:
(a) adhering 25 to 200 μm thick metallic layer comprising an anodic metal directly to a metal substrate; and
(b) applying 5 to 200 μm thick composite layer consisting essentially of a second anodic metal and a first dielectric polymeric material to the metallic layer, the application of the composite layer comprising spraying the first dielectric polymeric material on the metallic layer and spraying the second anodic metal on the metallic layer;
wherein the second anodic metal is substantially electrically connected to the metal substrate.

\* \* \* \* \*